United States Patent
Shimizu et al.

(10) Patent No.: US 8,548,228 B2
(45) Date of Patent: Oct. 1, 2013

(54) MULTI-VIEW IMAGE CODING METHOD, MULTI-VIEW IMAGE DECODING METHOD, MULTI-VIEW IMAGE CODING DEVICE, MULTI-VIEW IMAGE DECODING DEVICE, MULTI-VIEW IMAGE CODING PROGRAM, AND MULTI-VIEW IMAGE DECODING PROGRAM

(75) Inventors: Shinya Shimizu, Yokosuka (JP); Hideaki Kimata, Yokosuka (JP); Masayuki Tanimoto, Nagoya (JP)

(73) Assignees: Nippon Telegraph and Telephone Corporation, Tokyo (JP); National University Corporation Nagoya University, Nagoya (JP)

( * ) Notice: Subject to any disclaimer, the term of this patent is extended or adjusted under 35 U.S.C. 154(b) by 0 days.

(21) Appl. No.: 13/201,049

(22) PCT Filed: Feb. 23, 2010

(86) PCT No.: PCT/JP2010/001213
§ 371 (c)(1),
(2), (4) Date: Oct. 4, 2011

(87) PCT Pub. No.: WO2010/095471
PCT Pub. Date: Aug. 26, 2010

(65) Prior Publication Data
US 2012/0027291 A1   Feb. 2, 2012

(30) Foreign Application Priority Data

Feb. 23, 2009   (JP) .................. P 2009-038786

(51) Int. Cl.
*G06K 9/00* (2006.01)
*G06K 9/36* (2006.01)
*G06K 9/46* (2006.01)

(52) U.S. Cl.
USPC ......................................... 382/154; 382/233

(58) Field of Classification Search
USPC ................ 382/154, 162, 164, 167, 232, 233, 382/238; 375/240.03, 240.16, E07.123; 348/36, 43, 70, 231.3, 231.6, E13.07
See application file for complete search history.

(56) References Cited

U.S. PATENT DOCUMENTS 4,875,095 A * 10/1989 Matsumoto et al. ...... 375/240.12
6,055,330 A    4/2000 Eleftheriadis et al.
(Continued)

FOREIGN PATENT DOCUMENTS

JP   2001-509325       7/2001
JP   2007-036800 A     2/2007
(Continued)

OTHER PUBLICATIONS

Ince, Serdar, et al., "Depth Estimation for View Synthesis in Multimedia Video Coding," 3DTV Conference 2007, TR2007-025, Jun. 2007, pp. 1-4.

(Continued)

*Primary Examiner* — Amir Alavi
(74) *Attorney, Agent, or Firm* — Harness, Dickey & Pierce, P.L.C.

(57) ABSTRACT

The disclosed multi-view image coding/decoding device first obtains depth information for an object photographed in an area subject to processing. Next, a group of pixels in an already-coded (decoded) area which is adjacent to the area subject to processing and in which the same object as in the area subject to processing has been photographed is determined using the depth information and set as a sample pixel group. Then, a view synthesis image is generated for the pixels included in the sample pixel group and the area subject to processing. Next, correction parameters to correct illumination and color mismatches in the sample pixel group are estimated from the view synthesis image and the decoded image. A predicted image is then generated by correcting the view synthesis image relative to the area subject to processing using the estimated correction parameters.

24 Claims, 9 Drawing Sheets

(56) References Cited

U.S. PATENT DOCUMENTS

| | | | |
|---|---|---|---|
| 7,064,783 B2* | 6/2006 | Colavin et al. | 348/231.3 |
| 7,173,969 B2* | 2/2007 | Honda et al. | 375/240.03 |
| 8,154,585 B2* | 4/2012 | Yang | 348/43 |
| 2007/0109409 A1 | 5/2007 | Yea et al. | |
| 2007/0177671 A1 | 8/2007 | Yang | |
| 2009/0245692 A1* | 10/2009 | Okutomi et al. | 382/294 |
| 2010/0027881 A1 | 2/2010 | Kim et al. | |
| 2010/0246680 A1* | 9/2010 | Tian et al. | 375/240.16 |
| 2011/0211216 A1* | 9/2011 | Murayama | 358/1.14 |
| 2011/0286678 A1* | 11/2011 | Shimizu et al. | 382/233 |
| 2012/0027291 A1* | 2/2012 | Shimizu et al. | 382/154 |

FOREIGN PATENT DOCUMENTS

| | | |
|---|---|---|
| RU | 2 237 283 C2 | 9/2004 |
| RU | 2 296 379 C2 | 3/2007 |
| WO | 2006/033953 A1 | 3/2006 |
| WO | WO-2007/081176 A1 | 7/2007 |
| WO | 2007/094792 A1 | 8/2007 |
| WO | 2007/114608 A1 | 10/2007 |
| WO | WO-2008/048487 A2 | 4/2008 |

OTHER PUBLICATIONS

Merkle, P., et al., "The effects of multiview depth video compression on multiview rendering," Signal Processing: Image Communication, vol. 24, Jan. 2009, pp. 73-88.

Yea, Sehoon, et al., "View synthesis prediction for multiview video coding," Signal Processing: Image Communication, vol. 24, Jan. 2009, pp. 89-100.

Shinya Shimizu et al., "A study on Multi-view Video Coding with Shared Prediction Information by Depth Map", PCSJ 2007, Oct. 31, 2007, pp. 31-32.

ITU-T Rec. H.264/ISO/IEC 14496-10, "Advanced video coding for generic audiovisual services", Final Committee Draft, Document JVT-E022d7, Sep. 2002. (pp. 10-13, pp. 62-73).

Hideaki Kimata and Masaki Kitahara, "Preliminary results on multiple view video coding (3DAV)", document M10976 MPEG Redmond Meeting, Jul. 2004.

K. Yamamoto et al., "Multiview Video Coding Using View Interpolation and Color Correction," IEEE Transactions on Circuits and System for Video Technology, vol. 17, No. 11, pp. 1536-1449, Nov. 2007.

Brendan J. Frey et al., "Clustering by Passing Messages Between Data Points", Science 2007, Vo. 315(5814):pp. 972-976.

Shimizu, Shinya, et al., "Adaptive Appearance Compensated View Synthesis Prediction for Multiview Video Coding," Proceedings of 2009 IEEE International Conference on Image Processing, Cairo, Egypt, Nov. 7-10, 2009, pp. 2949-2952.

Shimizu, Shinya, et al., "Adaptive Filtering in View Synthesis Prediction for Multiview Video Coding," Proceedings of 2009 APSIPA Annual Summit and Conference, Sapporo, Japan, Oct. 4-7, 2009, pp. 363-366.

Martinian, Emin, et al., "View Synthesis for Multiview Video Compression," Picture Coding Symposium, TR2006-035, Apr. 2006.

Decision on Grant, Russian Patent Application No. 2011133831, Jun. 4, 2013.

* cited by examiner

MULTI-VIEW IMAGE CODING METHOD, MULTI-VIEW IMAGE DECODING METHOD, MULTI-VIEW IMAGE CODING DEVICE, MULTI-VIEW IMAGE DECODING DEVICE, MULTI-VIEW IMAGE CODING PROGRAM, AND MULTI-VIEW IMAGE DECODING PROGRAM

CROSS REFERENCE TO RELATED APPLICATIONS

This application is a 371 U.S. National Stage of International Application No. PCT/JP2010/001213, filed Feb. 23, 2010. This application claims priority to Japanese Patent Application No. JP 2009-038786, filed Feb. 23, 2009. The disclosures of the above applications are entirely incorporated herein by reference.

TECHNICAL FIELD

The present invention relates to a multi-view image coding method and device for coding images photographed by a plurality of cameras which are photographing a particular object, and also to a multi-view image decoding method and device for decoding coded data which has been encoded using this multi-view image coding method, and also to a multi-view image coding program that is used to implement this multi-view image coding method, and to a multi-view image decoding program that is used to implement this multi-view image decoding method.

BACKGROUND ART

The term 'multi-view images' refers to a plurality of images obtained by photographing the same object and background using a plurality of cameras, while the term 'multi-view moving images (i.e., 'multi-view video')' refers to moving images obtained in this way.

Motion compensated prediction and disparity compensated prediction have been proposed as technologies for use in general moving image coding and multi-view moving image coding.

Motion compensated prediction is a method which is also employed in International Standards for moving image coding formats of recent years typified by H.264. In this method, the motion of an object is compensated between a frame targeted for coding and a reference frame that has already been coded so as to obtain an inter-frame difference for the image signal, and only this difference signal is coded (see Non-patent document 1).

In contrast, in disparity compensated prediction, by compensating disparities in an object by using a frame photographed by a different camera as the reference frame, coding can be performed as the inter-frame differences between image signals are being obtained (see Non-patent document 2).

The term 'disparity' which is used here refers to differences in positions on the image planes of cameras placed at different positions where the same position on an object is projected. In disparity compensated prediction, this is represented by two-dimensional vectors and then coded. As is shown in FIG. 9, because disparities are information whose creation is dependent on the camera position and on the distance from the camera (i.e., the depth), a method known as view synthesis prediction (view interpolation prediction) which utilizes this principle exists.

In view synthesis prediction (view interpolation prediction), a method exists in which the depth of an object is estimated using camera position information and triangulation theory for multi-view video obtained on the coding side or the decoding side, and frames targeted for coding are synthesized (i.e., interpolated) using this estimated depth information so as to create a prediction image (see Patent document 1 and Non-patent document 3). Note that if the depth is estimated on the coding side, it is necessary to encode the depth which is used.

In prediction which uses images photographed using these separate cameras, if individual differences exist between the responses of the camera imaging elements, or if gain control or gamma correction are performed in each camera, or if the settings for the depth of field or aperture or the like are different in each camera, or if there is a direction-dependent illumination effect in the scene, or the like, then the coding efficiency deteriorates. The reason for this is that the prediction is made on the assumption that the illumination and color of the object are the same in both the frame targeted for coding and the reference frame.

Methods such as illumination compensation and color correction are being investigated as ways of dealing with changes in the illumination and color of an object. In these methods, by using a reference frame whose illumination and color have been corrected as the frame which is used for making a prediction, it is possible to limit the amount of prediction residual which is encoded to a minimum.

In H.264, the weighted prediction in which a linear function is used as a correction model is adopted (see Non-patent document 1), while in Non-patent document 3, a method is proposed in which corrections are made using a color table.

Documents of the Prior Art

[Patent document 1] Japanese Patent Application Laid-Open (JP-A) No. 2007-036800"Video coding method, video decoding method, video coding program, video decoding program, and computer readable recording medium on which these programs are recorded"
[Non-Patent Document 1]
ITU-T Rec. H.264/ISO/IEC 11496-10, "Advanced video coding for generic audiovisual services", Final Committee Draft, Document JVT-E022d7, September 2002.(pp. 10-13, pp. 62-73)
[Non-Patent Document 2]
Hideaki Kimata and Masaki Kitahara, "Preliminary results on multiple view video coding (3DAV)", document M10976 MPEG Redmond Meeting, July, 2004.
[Non-Patent Document 3]
K. Yamamoto, M. Kitahara, H. Kimata, T. Yendo, T. Fujii, M. Tanimoto, S. Shimizu, K. Kamikura, and Y. Yashima, "Multiview Video Coding Using View Interpolation and Color Correction," IEEE Transactions on Circuits and System for Video Technology, Vol. 17, No. 11, pp. 1436-1449, November, 2007.

DISCLOSURE OF INVENTION

Problem to be Solved by the Invention

The following two problems exist when coding is performed using the aforementioned illumination compensation and color correction.

The first problem is the increase in the amount of code that results from the addition of parameters for illumination compensation and color correction and the like. In normal disparity compensated prediction and view synthesis (interpolation) prediction, because it becomes necessary to encode parameters for illumination compensation and color correction and the like which had not previously required encoding, there is a deterioration in the coding efficiency.

The second problem is the accuracy of the correction. In the case of fade and flash in normal moving image coding, because the entire screen changes in the same way, it is possible to perform satisfactory illumination compensation and color correction and the like using a single correction parameter. However, mismatches (i.e., discrepancies in illumination and color) which are caused by the object not being a complete diffuse reflector, or by the depth of field and focus not completely matching in each camera are not dependent on the scene, but on the object. As a consequence, in correction which is based on a single correction parameter, there are cases when, depending on the object, mismatching is increased.

To counter this problem, a method in which a plurality of correction parameters are used in order to deal with mismatching in each individual object may be considered. However, if this method is used, then in addition to the amount of code required to encode a plurality of correction parameters, it is also necessary to encode information showing which correction parameter is to be used in each image area. As a result, the amount of code increases even further, and it is not possible to solve the first problem.

The present invention was conceived in view of the above described circumstances, and it is an object thereof to provide new multi-view image coding and decoding technology that achieves highly efficient coding even in multi-view images (i.e., multi-view still images and moving images) in which localized illumination and color mismatching is generated between cameras, and that also achieves a reduction in the amount of code required each time this new coding is employed.

Means for Solving the Problem

[1] Basic Technological Idea Behind the Present Invention

In order to solve the above described problems, in the present invention, the following means have been devised for cases in which a frame targeted for coding-decoding is first divided into areas, and then multi-view image coding and decoding is performed in each area.

Firstly, depth information for an object being photographed in an area targeted for processing is determined. Next, in an area adjacent to the area targeted for processing where coding (decoding) has already been completed, a pixel group in which the same object as in the area targeted for processing has been photographed is determined from the depth information and is set as a sample pixel group. Next, a view synthesis image is created for the pixels contained in this sample pixel group, and a view synthesis image is also created for the pixels contained in the area targeted for processing. Next, correction parameters for correcting mismatching in illumination and color are estimated from the view synthesis image and the decoded image in the sample pixel group. Next, by correcting the view synthesis image created for the area targeted for processing using the estimated correction parameters, a prediction image to be used for coding (decoding) image signals in the area targeted for processing is created.

In the case of the conventional method in which correction parameters are calculated by comparing the frame targeted for coding with a reference frame, because the frame targeted for coding cannot be acquired by the decoding side, it is necessary to encode the correction parameters.

In contrast, in the present invention, correction parameters are calculated by comparing image signals of already coded/decoded areas of a frame targeted for coding/decoding with information of a view synthesis image created using a reference frame. Because these can be acquired by the decoding side, it is not necessary to encode the correction parameters. Namely, it is possible, by means of the present invention, to solve the problem of an increase in the amount of code.

Moreover, because coding is a process in which input signals are converted as correctly as possible, it can be considered that image signals that have already been coded/decoded are substantially the same as image signals targeted for coding. Namely, correction parameters calculated by means of the present invention can bring the synthesized image extremely close to the image targeted for coding, and prediction residual which must be coded can be significantly reduced.

Moreover, in the present invention, correction parameters are estimated using information of adjacent areas where the same object as the object photographed in the area targeted for processing has been photographed. By doing this, it is possible to correct illumination and color which is dependent on the object. Note that because depth information which is required when a view synthesis image is being created is used in this determination of the object, there is no need to encode and transmit additional information.

In the above described multi-view coding/decoding, by comparing the variance of depth information in an area targeted for processing with a predefined threshold value, it is possible to determine whether or not a plurality of objects have been photographed within an area targeted for processing. If a plurality of objects have been photographed, then depth information and sample pixel groups are determined for each object, and correction parameters are estimated. Note that by processing objects that have less than a fixed number of pixels in an area targeted for processing with other objects, it is possible to prevent any increase in the amount of calculation.

Furthermore, in the above described multi-view image coding/decoding, correction models of which a plurality exist (i.e., the number of correction parameters) are altered based on the number of pixels in a sample pixel group.

[2] Structure of the Present Invention

Next, the structure of the multi-view image coding device and multi-view image decoding device of the present invention will be described.

[2-1] Structure of the Multi-View Image Coding Device of the Present Invention

The multi-view image coding device of the present invention is a device that encodes multi-view images (i.e., static images and moving images photographed from multiple viewpoints) by dividing an input image of an object which is photographed by a first camera into a plurality of coding target areas and, using a view synthesis image which is synthesized from depth information for the input image and from an already coded image of the same object photographed by a second camera that is located in a different position from the first camera, by performing predictive coding for each of the coding target areas, and that includes: (1) a representative depth setting unit that sets representative depth information for an object photographed in the coding target area; (2) a sample pixel group setting unit that, based on depth information for an already coded area that is adjacent to the coding target area and on the representative depth information, determines a group of pixels where the same object as in the coding target area has been photographed and sets the group of pixels as a sample pixel group; (3) a correction parameter estimation unit that, based on the view synthesis image for the sample pixel group and on a decoded image that has been decoded for the sample pixel group, estimates correction parameters for correcting illumination and color mismatches; (4) a view synthesis image correction unit that, using the correction parameters, corrects the view synthesis image for the coding target area so as to create a corrected view synthesis image; (5) an image coding unit that, using the corrected view synthesis image, codes an image signal of the coding target image is coded so as to create coded data; and (6) an image decoding unit that decodes the coded data so as to create a decoded image for the coding target area.

It is also possible for the multi-view image coding device according to an embodiment of the present invention to be further provided with (7) an object determination unit that divides pixels in the coding target area into one or several groups using depth information for the relevant pixels as a reference. In this case, it is also possible for the representative depth setting unit to set the representative depth information for each group determined by the object determination unit, for the sample pixel group setting unit to set a sample pixel group for each group determined by the object determination unit, for the correction parameter estimation unit to estimate correction parameters for each group determined by the object determination unit, and for the view synthesis image correction unit to correct a view synthesis image for each group determined by the object determination unit.

Moreover, it is also possible for the multi-view image coding device according to an embodiment of the present invention to be further provided with (8) a correction model selection unit that selects a correction model for correcting the view synthesis image for the coding target area in accordance with the number of pixels in the sample pixel group. In this case, it is also possible for the correction parameter estimation unit to estimate correction parameters for the correction model selected by the correction model selection unit, and for the view synthesis image correction unit to correct the view synthesis image using the correction model selected by the correction model selection unit.

The multi-view image coding method of the present invention which is implemented as a result of each of the above described processing devices performing their respective operations can also be achieved by means of a computer program. This computer program is supplied by being recorded on a suitable computer readable recording medium, or is supplied via a network. When the present invention is to be applied, the computer program is installed on a computer and the present invention is achieved when the computer program is operated on a control unit such as a CPU.

[2-2] Structure of the Multi-View Image Decoding Device of the Present Invention The multi-view image decoding device of the present invention is a device that decodes coded data for multi-view images (i.e., static images and moving images photographed from multiple viewpoints) by dividing a decoding target image of an object which is photographed by a first camera into a plurality of decoding target areas and, using a view synthesis image which is synthesized from depth information for the decoding target image and from an already decoded image of the same object photographed by a second camera that is located in a different position from the first camera, by performing predictive decoding for each of the decoding target areas, and that includes: (1) a representative depth setting unit that sets representative depth information for an object photographed in the decoding target area; (2) a sample pixel group setting unit that, based on depth information for an already decoded area that is adjacent to the decoding target area and on the representative depth information, determines a group of pixels where the same object as in the decoding target area has been photographed and sets the group of pixels as a sample pixel group; (3) a correction parameter estimation unit that, based on the view synthesis image for the sample pixel group and on a decoded image that has been decoded for the sample pixel group, estimates correction parameters for correcting illumination and color mismatches; (4) a view synthesis image correction unit that, using the correction parameters, corrects the view synthesis image for the decoding target area so as to create a corrected view synthesis image; and (5) an image decoding unit that, using the corrected view synthesis image, decodes an image signal of the decoding target image.

It is also possible for the multi-view image decoding device according to an embodiment of the present invention to be further provided with (6) an object determination unit that divides pixels in the decoding target area into one or several groups using depth information for the relevant pixels as a reference. In this case, it is also possible for the representative depth setting unit to set the representative depth information for each group determined by the object determination unit, for the sample pixel group setting unit to set a sample pixel group for each group determined by the object determination unit, for the correction parameter estimation unit to estimate correction parameters for each group determined by the object determination unit, and for the view synthesis image correction unit to correct a view synthesis image for each group determined by the object determination unit.

It is also possible for the multi-view image decoding device according to an embodiment of the present invention to be further provided with (7) a correction model selection unit that selects a correction model for correcting the view synthesis image for the decoding target area in accordance with the number of pixels in the sample pixel group. In this case, the correction parameter estimation unit estimates correction parameters for the correction model selected by the correction model selection unit, and the view synthesis image correction unit corrects the view synthesis image using the correction model selected by the correction model selection unit.

The multi-view image decoding method of the present invention which is implemented as a result of each of the above described processing devices performing their respective operations can also be achieved by means of a computer program. This computer program is supplied by being recorded on a suitable computer readable recording medium, or is supplied via a network. When the present invention is to be applied, the computer program is installed on a computer and the present invention is achieved when the computer program is operated on a control unit such as a CPU.

Effect of the Invention

According to the present invention, even in cases in which illumination and color mismatch between cameras occur locally, it is possible to reduce prediction residual because correction parameters are determined for each object separately and locally. Accordingly, it is possible to achieve highly efficient coding and decoding of multi-view images and multi-view moving images.

Moreover, according to the present invention, because the correction parameters are determined in a way that does not require additional coding/decoding, it is possible to considerably reduce the amount of code required when this coding and decoding of multi-view images and multi-view moving images is performed.

EMBODIMENTS FOR CARRYING OUT THE INVENTION

The present invention will now be described in detail with reference made to drawings illustrating embodiments of the present invention.

Note that in the following description, by attaching position information (namely, coordinate values or index which can be associated with coordinate values) enclosed by the symbol [ ] to video (i.e., frames) and to depth information, image signals and the depth information (defined for each pixel) of objects photographed in pixels in that position are shown.

Figure 1:
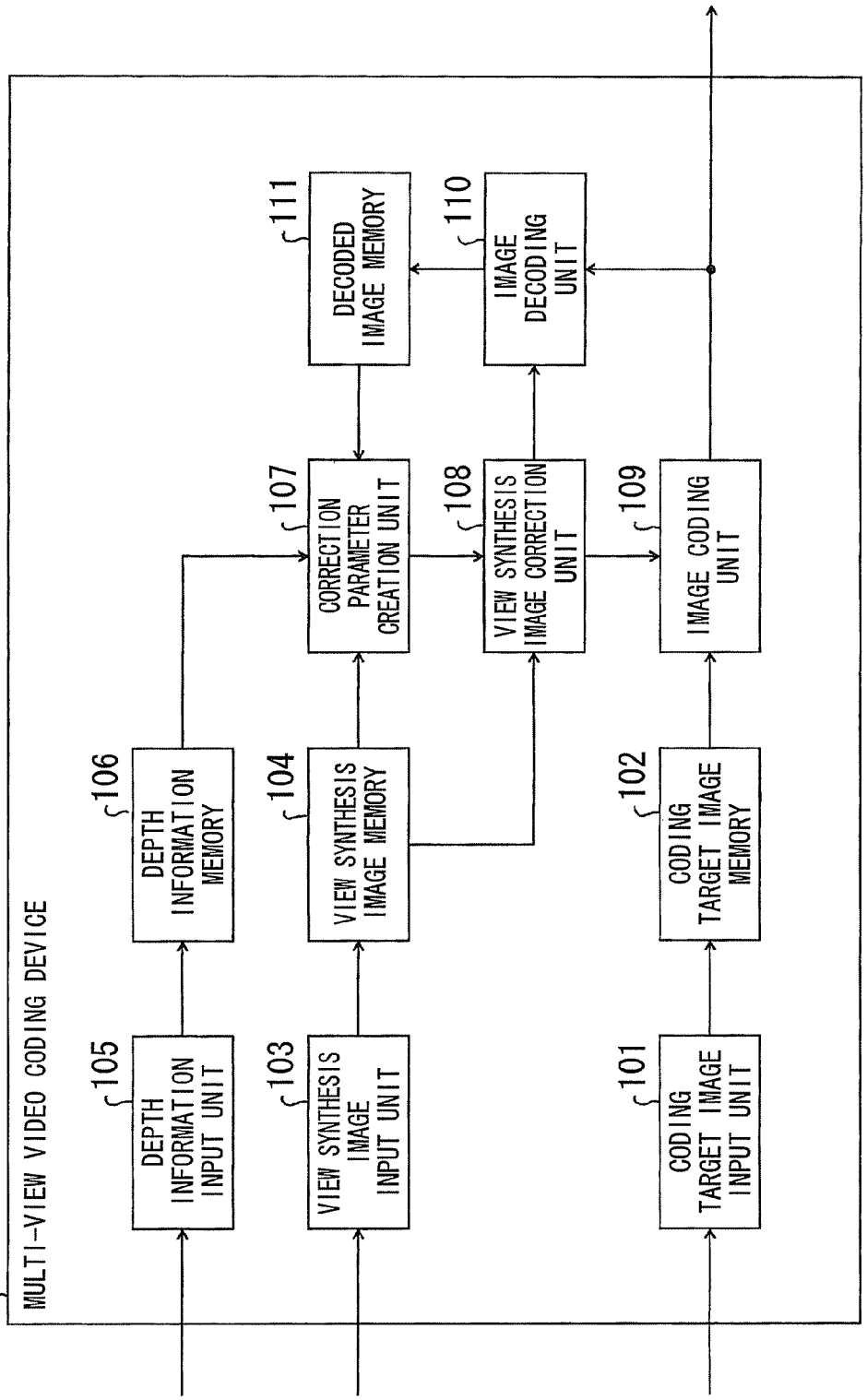
FIG. 1 is a block diagram showing a multi-view video coding device according to a first embodiment of the present invention.

[1] Multi-View Video Coding Device According to a First Embodiment of the Present Invention The structure of a multi-view video coding device 100 according to the first embodiment of the present invention is shown in FIG. 1.

As is shown in FIG. 1, in the multi-view video coding device 100 of the present embodiment, a coding target image input unit 101 receives inputs of images (i.e., frames) of an object or scene photographed by a first camera as a coding target. Coding target image memory 102 stores coding target frames input from the coding target image input unit 101. The stored coding target frames are supplied to an image coding unit 109.

A view synthesis image input unit 103 receives inputs of view synthesis images for coding target images. View synthesis images have been generated using the already coded images on which the same object or scene was photographed by second cameras placed in different positions from the first camera. View synthesis image memory 104 stores view synthesis images input from the view synthesis image input unit 103. Stored view synthesis images are supplied to a correction parameter creation unit 107 and a view synthesis image correction unit 108.

A depth information input unit 105 receives inputs of depth information for frames targeted for coding. Depth information memory 106 stores depth information input from the depth information input unit 105. The stored depth information is supplied to the correction parameter creation unit 107.

The correction parameter creation unit 107 estimates correction parameters using view synthesis images, depth information, and decoded images used in peripheral areas of a coding target area, and using depth information used in the coding target area. The view synthesis image correction unit 108 corrects view synthesis images of the area targeted for coding using the estimated correction parameters.

The image coding unit 109 encodes image signals of a coding target area using the corrected view synthesis images as prediction signals. The image decoding unit 110 decodes coded image signals. Decoded image memory 111 stores images decoded by the image coding unit 109. Decoded images stored in the decoded image memory 111 are supplied to the correction parameter creation unit 107.

Figure 8:
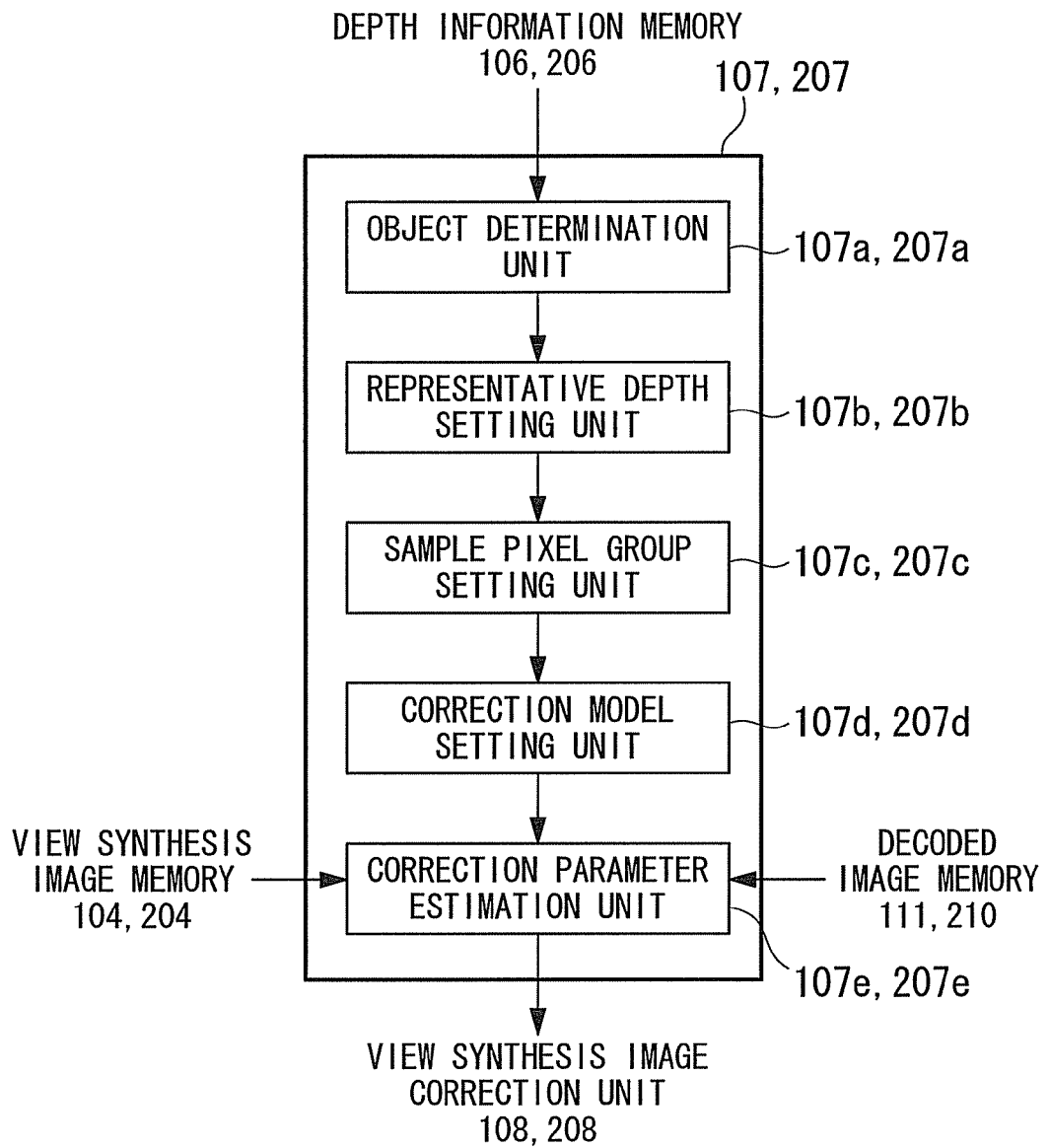
FIG. 8 is a block diagram showing a correction parameter creation unit in the first and second embodiments of the present invention.
Figure 9:
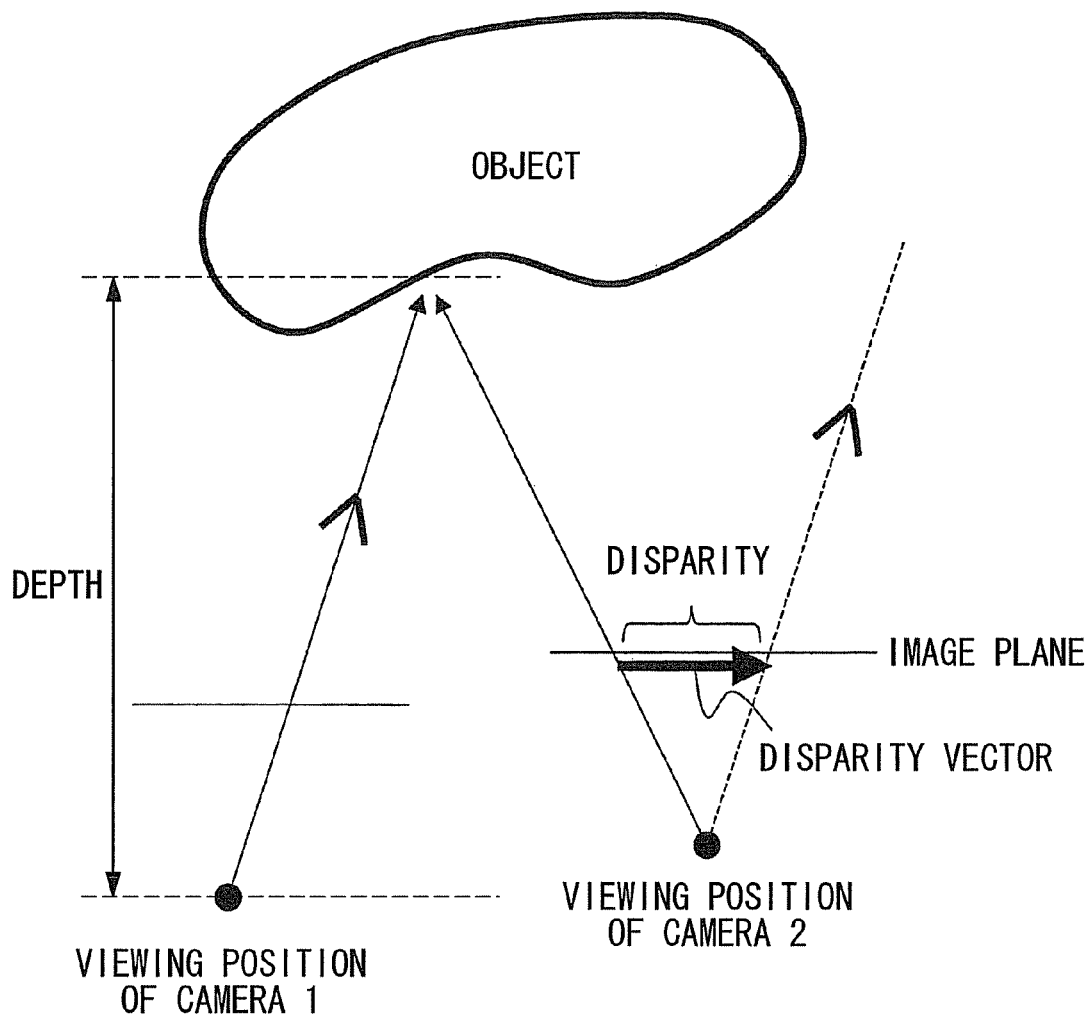
FIG. 9 is a view showing a disparity compensated prediction mode.

As is shown in FIG. 8, the correction parameter creation unit 107 has an object determination unit 107a to which depth information is supplied from the depth information memory 106, and a representative depth setting unit 107b and a sample pixel group setting unit 107c which are connected in this sequence to the downstream side of the object determination unit 107a. A correction model selection unit 107d and a correction parameter estimation unit 107e are connected in this sequence to the downstream side of the sample pixel group setting unit 107c. Decoded images from the decoded image memory 111 and view synthesis images from the view synthesis image memory 104 are supplied to the correction parameter estimation unit 107e, and correction parameters estimated using the supplied decoded images and view synthesis images are supplied to the view synthesis image correction unit 108.

Figure 2:
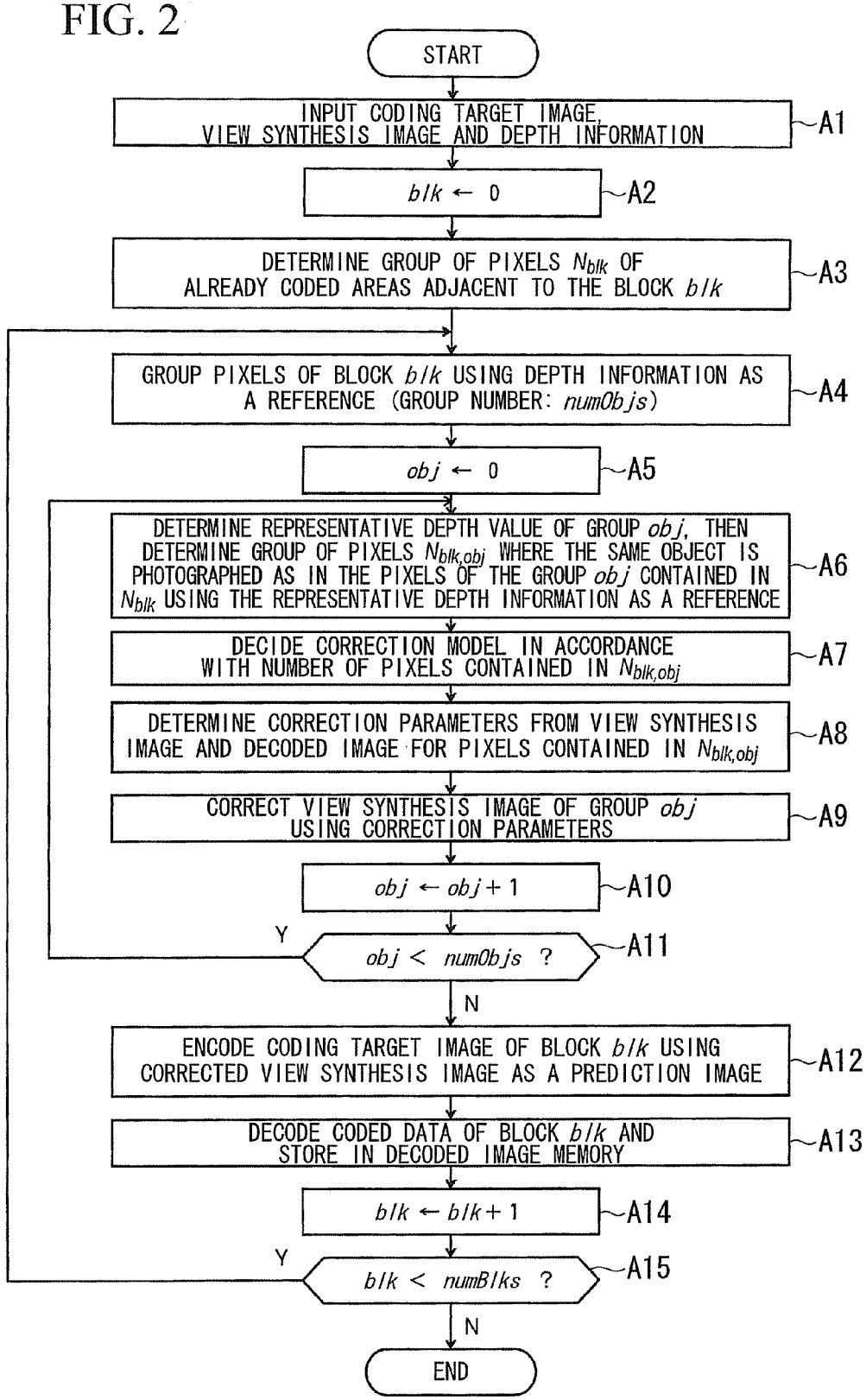
FIG. 2 is a flow chart showing processing executed by the multi-view video coding device according to the first embodiment of the present invention.

FIG. 2 shows the flow of processing executed by the multi-view video coding device 100 of the present embodiment which is constructed in the above-described manner.

The processing executed by the multi-view video coding device 100 of the present embodiment will now be described in detail in accordance with this processing flow.

Firstly, a frame Org which is targeted for coding is input by the coding target image input unit 101, and is stored in the coding target image memory 102. A view synthesis image Synth for the coding target frame Org is input by the view synthesis image input unit 103, and is stored in the view synthesis image memory 104. Depth information Depth for the coding target frame Org is input by the depth information input unit 105, and is stored in the depth information memory 106 [A1].

The view synthesis image and the depth information which are input here are the same as those obtained at the decoding device. The reason for this is that, by using the same information as the information obtained at the decoding device, the generation of coding noises such as drift can be suppressed. However, if the generation of such coding noise is permissible, then it is also possible for the original pre-coding information to be input.

Note that the depth information is provided from outside the multi-view video coding device 100, however, as is described in Non-patent document 3, it is also possible to obtain the depth information by estimating it from already coded frames on other cameras. Accordingly, it is not essential for the depth information to be transmitted from the transmitting side to the receiving side. The view synthesis image is generated using already coded frames on cameras other than the first camera and depth information.

Next, the coding target frame is divided into a plurality of coding target areas, and the image signal of the coding target frame is coded by the image coding unit 109 with correcting the view synthesis image for each of these areas [A2-A15].

Namely, if an index of the coding processing block is expressed as blk, and if the total number of all the coding processing blocks is expressed as numBlks, then after blk has been initialized to 0 [A2], the following steps [A3-A13] are repeated with 1 being added to blk [A14] until blk reaches numBlks [A15].

In the processing that is repeated for each coding processing block, the coding device 100 first determines a group of pixels $N_{blk}$ of already-coded areas peripheral to the block blk (i.e., the coding target area) [A3].

Various types of unit can be used for these peripheral areas such as coding processing blocks which are adjacent to the block blk, or adjacent pixels or the like. Although a variety of definitions can be used for the peripheral areas, it is necessary for the same definition as that used on the decoding side to be used.

Next, the object determination unit 107a of the correction parameter creation unit 107 groups pixels within the block blk using the depth information provided for each pixel as a reference [object determination step A4].

The index of each group resulting from this is expressed by obj, the number of groups is expressed by numObjs, and the pixels belonging to the group obj are expressed as $C_{obj}$.

Any method may be used for this grouping operation, however, it is necessary for the same method as that used on the decoding side to be used. The most simple grouping method is one in which the variance of depth information for pixels within the block blk is calculated, and if the value thereof is equal to or less than a threshold value then all of the pixels are set as one group, while if the value is more than the threshold value, then the average of the depth values is set as a boundary and the pixels are divided into two groups. In this case, once the variances of the depth information of the pixels in each group become equal to or less than a particular threshold value, the grouping is ended.

A more complex grouping method is one in which, at the start, each pixel is considered to be forming one group. Then, when any two groups are fused together, the fusion is performed in sequence from the groups having the smallest increase in the variance of the depth information of the pixels within the group. In this case, if a group having a variance that exceeds a particular threshold value ends up being created no matter which two particular groups are fused together, then the grouping is ended.

Note that because the amount of calculation increases as the number of groups increases, it is also possible for a maximum number of groups to be defined in advance. By ending the grouping operation once the number of groups reaches this maximum value, or by defining in advance a minimum number of pixels to be contained within a single group so that small groups do not get created, it is possible to prevent the number of groups increasing. If the block size is 16×16 pixels, which is a typical block size of one unit for image coding, then generally, it is rare for a large number of objects to be photographed in the same block. Accordingly, highly precise grouping can be achieved even if the maximum number of groups is two.

Once the grouping operation has ended, a prediction image Pred is created by correcting the view synthesis image for each pixel of each group [A5-A11].

Namely, after the group index obj has been initialized to 0 [A5], steps [A6-A8] are performed in which, with incrementing obj by 1 [A10], correction parameters are estimated in order to correct the view synthesis image in the correction parameter creation unit 107 until obj reaches numObjs [A11].

Together with the steps, in the view synthesis image correction unit 108, a step [A9] to create a prediction image by correcting the view synthesis images for pixels contained in the group obj using the estimated prediction parameters is performed.

In the correction parameter estimation processing, firstly, based on the depth information, a group of pixels $N_{blk,obj}$ (i.e., a sample pixel group) in which the same object as in the group obj is photographed and that is included in the group of pixels $N_{blk}$ in the already-coded areas peripheral to the block blk (i.e., the coding target area) is determined [representative depth setting step and sample pixel group setting step A6].

Specifically, in this processing, firstly, in the representative depth setting unit 107b, a representative depth value $D_{obj}$ for the group obj is determined (representative depth setting step). Any method may be used to determine the representative depth value $D_{obj}$, provided that it is possible to determine a single depth value from the depth information on the pixels $C_{obj}$ within the group obj. However, it is necessary to use the same processing as that used on the decoder side. For example, an average value or a median value or the like may be used. In the case that average values are used, the representative depth value $D_{obj}$ can be expressed by the following Formula (1). Note that $\| \; \|$ shows the number of pixels in the set.

$$D_{obj} = \frac{1}{\|C_{obj}\|} \sum_{p \in C_{obj}} \text{Depth}[p] \qquad (1)$$

Note that some grouping methods, in which divide pixels into several groups using the depth information as a reference in the object determination step A4, determine the pixels and/or depth information that represent each group as a part of their process. If this type of method is used, the depth information for the pixel used as representative of the group at that time and also the depth information showing the group may be used as representative depth values. In this case, the processing of the representative depth setting step is performed at the same time in the object determination step A4. Affinity Propagation is one of the most famous methods in which the deciding of the representative of the group and the grouping processing are performed simultaneously. The details of this method are described in "Clustering by Passing Messages Between Data Points", B. J. Frey and D. Dueck, Science 2007, Vol. 315(5814): pp. 972-976.

When the representative depth value $D_{obj}$, has been determined in this way, next, in the sample pixel group setting unit 107c, a group of pixels $N_{blk,obj}$ (i.e., a sample pixel group) in which the same object as in the group obj is photographed and that is a subset of the group $N_{blk}$ is determined (sample pixel group setting step). As is shown by the following Formula (2), the group $N_{blk,obj}$ can be defined by selecting the pixels where the absolute difference between its depth value and the representative depth value is less than the pre-defined threshold thSameObj.

$$N_{blk,obj} = \{p \,|\, p \in N_{blk} \cap |D_{obj} - \text{depth}[p]| < \text{thSameObj}\} \qquad (2)$$

After the group $N_{blk,obj}$ has been determined, a correction model is selected by the correction model selection unit 107d from pre-defined correction models based on the number of pixels in this group [correction model selection step A7].

It is possible for several correction models to be prepared, however, it is necessary for the same correction model to be prepared on the decoding side as well, and it is also necessary to use the same criteria to decide a correction mode to be used. Moreover, if only one correction model has been prepared, then this step can be omitted.

The processing to create a prediction image by correcting a view synthesis image which is performed in step 9A (described below) can be expressed as a function which has a view synthesis image as an input and outputs a prediction image. The term correction model refers to a model of the function used at this time. This may be, for example, correction based on offset, correction which employs a linear function, or two-dimensional linear filter processing having a tap length k. When the pixel to be corrected is denoted as p, these can be expressed by the following Formula (3) through Formula (5), respectively.

$$Pred[p] = Synth[p] + \text{offset} \quad (3)$$

$$Pred[p] = \alpha \cdot Synth[p] + \beta \quad (4)$$

$$Pred[p] = \sum_{i=-k}^{i=k} \sum_{j=-k}^{j=k} (F_{i,j} \cdot Synth[p + (i, j)^T]) + o \quad (5)$$

Correction based on offset and correction which employs a linear function are typical examples of correction which is based on linear filter processing. Note that it is not necessary for the correction processing to be linear processing and it is also possible for a non-linear filter to be used provided that correction parameter estimation is possible. An example of a non-linear correction method is gamma correction. Gamma correction can be expressed by the following Formula (6).

$$Pred[p] = (Synth[p] - a)^{\frac{1}{\gamma}} + b \quad (6)$$

In examples of these correction models, offset, $(\alpha, \beta)$, $(\{F_{ij}\}, o)$, and $(\gamma, a, b)$ respectively form the correction parameters. Namely, the number of correction parameters changes depending on the correction model.

As the number of correction parameters increases, it becomes possible to perform more accurate correction, however, in order to decide these correction parameters, it is necessary that the number of samples should be equal to or more than the number of correction parameters. As is described below, because this sample forms a view synthesis image and decoded image of the sample pixels contained in the previously described group $N_{blk,obj}$, by deciding the correction model in accordance with the number of pixels of the group $N_{blk,obj}$, it becomes possible to make corrections accurate. Note that using as many samples as possible in the correction parameter estimation enables more robust estimation on correction parameters. Accordingly, it is desirable for the correction model to be selected so as to ensure sufficient robustness.

After a single correction model has been selected, in the correction parameter estimation unit 107e, a view synthesis image Synth and a decoded image Dec for the sample pixels contained in the group $N_{blk,obj}$ are taken as samples, and the correction parameters on the selected correction model are estimated [correction parameter estimation step A8].

In the estimation of the correction parameters performed here, the pre-correction value and ideal corrected value are assumed as the view synthesis image and the decoded image, respectively. Then the correction parameters are determined so as to minimize a sum of error, for all pixels in the group $N_{blk,obj}$ between the ideal value and the value which is a result of the correction using the correction model fro each pixel.

For example, if linear processing is used for the correction, then the correction parameters can be decided using the least square method. Namely, when M denotes the correction, the estimation can be done by the minimization of a value expressed by the following Formula (7).

$$\sum_{p \in N_{blk,obj}} (Dec[p] - M(Synth[p]))^2 \quad (7)$$

Namely, it is possible to determine the correction parameters by solving simultaneous equations in which the partial derivative of Formula (7) with respect to each correction parameter is equal to 0.

Once the correction parameters have been estimated, in the view synthesis image correction unit 108, by correcting the view synthesis image Synth for the group obj of the block blk using the correction parameters, a prediction image Pred is created for the group obj of the block blk [view synthesis image correction step A9].

Figure 3:
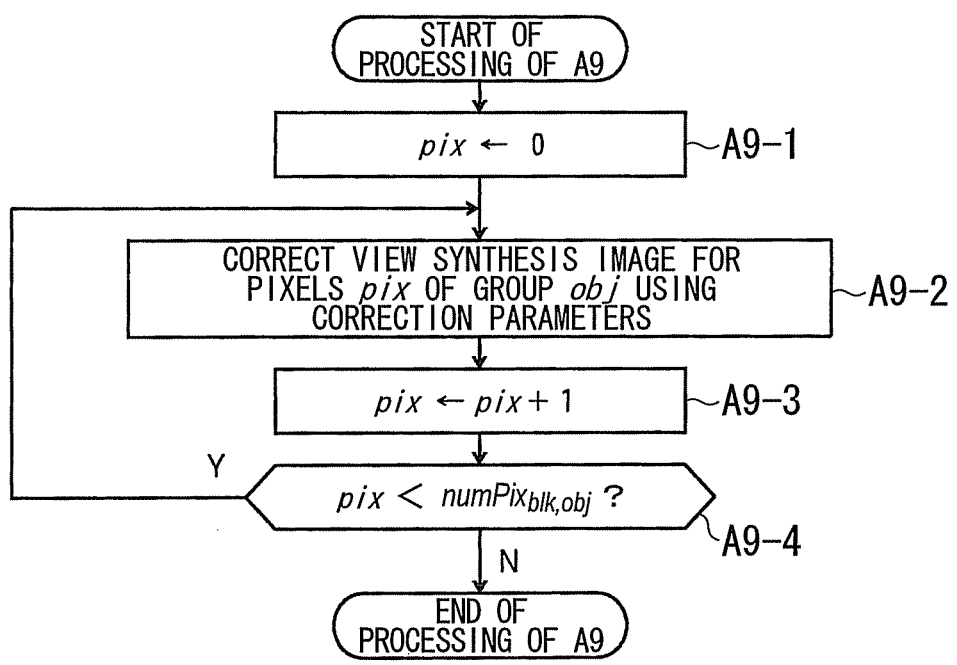
FIG. 3 is a flow chart showing details of the processing executed by the multi-view video coding device according to the first embodiment of the present invention.

Specifically, as is shown in the processing flow in FIG. 3, the processing to create this prediction image Pred is performed for each pixel. Here, in the processing flow in FIG. 3, pix indicates pixel identification information, and numPix$_{blk,obj}$ indicates the number of pixels within the group obj of the block blk.

For example, in the case of correction which is performed using offset values, the prediction image Pred is created in accordance with the above-described Formula (3).

Figure 4:
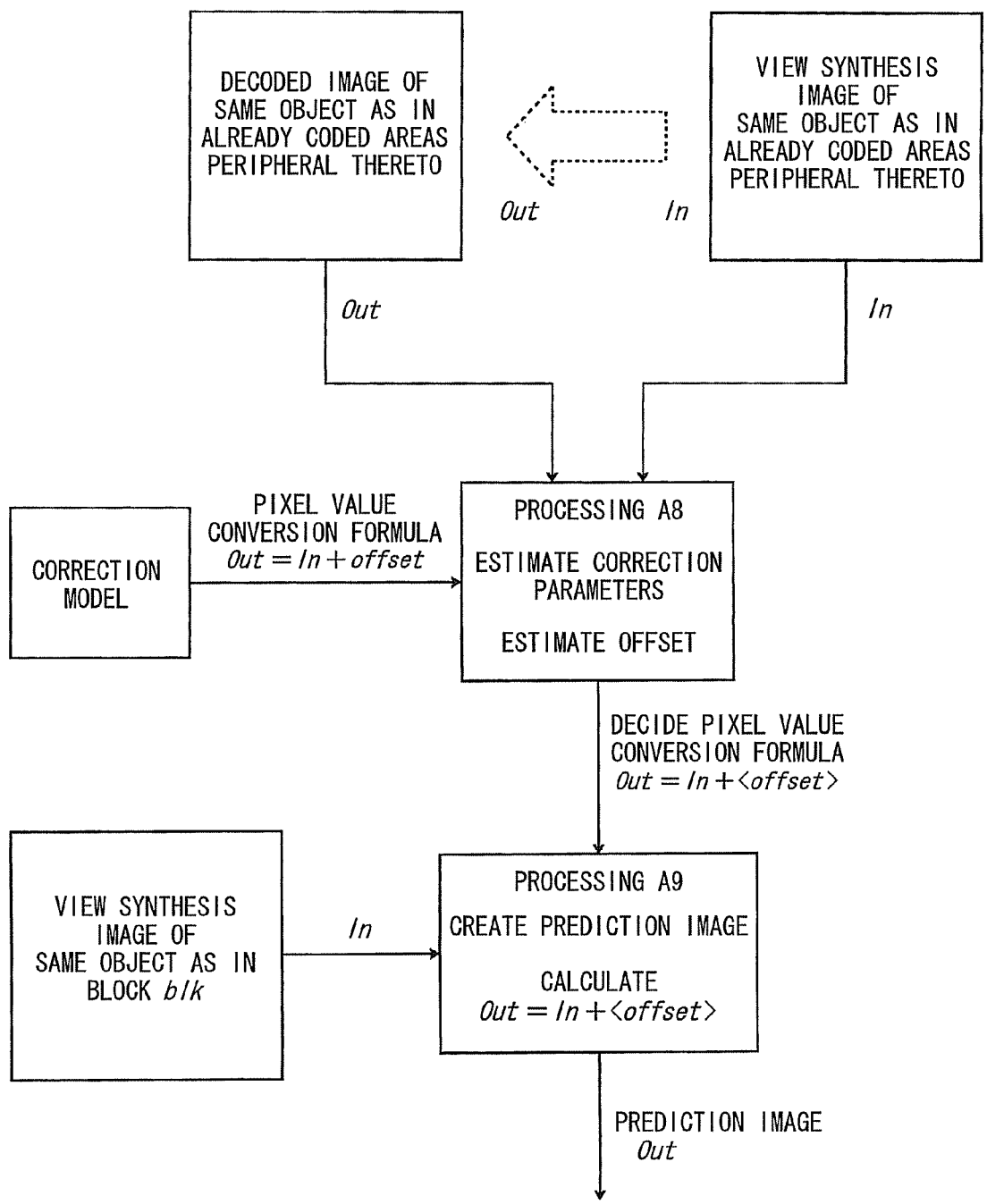
FIG. 4 is a flowchart showing the processing executed by the multi-view video coding device according to the first embodiment of the present invention.

For the creation of this prediction image Pred, an example is described in which the correction of Formula (3) which employs offset values is performed as the correction method (i.e., correction model). As is shown in FIG. 4, in the correction parameter estimation step A8, by estimating the offset when the pixel values of view synthesis images for the same object which is present in peripheral areas that have already been coded are taken as In, and the pixel values of decoded images of that object are taken as Out, a conversion equation for pixels as correction model is constructed. Next, in step S9, processing is performed to generate the prediction image for the group obj of the block blk by substituting the pixel values of the view synthesis image on the group obj of the block blk into In of the constructed conversion equation.

After the creation of the prediction image for the block blk has ended, in the image coding unit 109, coding of the coding target frame Org is performed for the block blk [image coding step A12] with the prediction image Pred created in step A9 being used for the prediction signal.

In this coding step A12, there are no restrictions on which coding method may be used, however, in a typical coding method such as H.264, coding is achieved by applying DCT-quantization-binarization-entropy coding on the difference between Org and Pred.

The bit stream resulting from the coding forms the output from the multi-view video coding device 100. Moreover, the bit stream resulting from the coding is decoded by the image decoding unit 110 for each block, and a decoded image Dec which is the result obtained from the decoding is stored in the decoded image memory 111 to be used for estimating correction parameters in other blocks [image decoding step A13].

In this manner, even in cases in which illumination and color mismatches occur between cameras in a localized manner in accordance with the object, the multi-view video coding device 100 which is constructed in the manner shown in FIG. 1 determines correction parameters to counter these mismatches in a localized manner in accordance with the object in order to make it possible to code multi-view video with a high level of efficiency. Moreover, in order to avoid any increase in the amount of code, this multi-view video coding device 100 determines these correction parameters in the manner in which it is unnecessary to code/decode the obtained correction parameters while the multi-view video is coded with the local illumination and color correction.

In the present embodiment, a case has been described in which the image signal of the block blk is coded with the usage of view synthesis images being essential, however, the prediction that utilizes view synthesis images described in the present embodiment can also be used as just one prediction mode from among a plurality of prediction modes.

Figure 5:
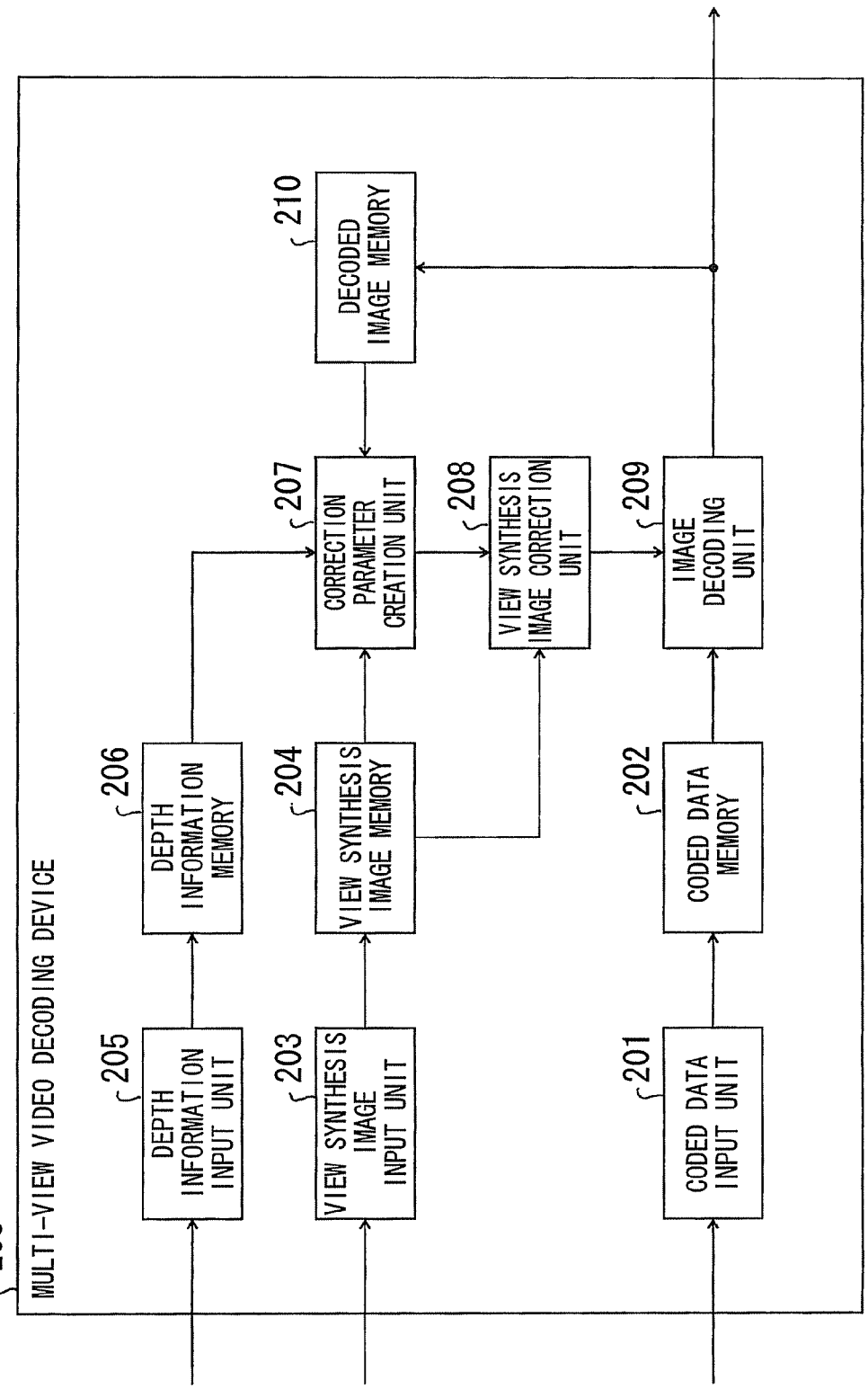
FIG. 5 is a block diagram showing a multi-view video decoding device according to a second embodiment of the present invention.

[2] Multi-View Video Decoding Device According to a Second Embodiment of the Present Invention The structure of a multi-view video decoding device 200 according to the second embodiment of the present invention is shown in FIG. 5.

As is shown in FIG. 5, in the multi-view video decoding device 200 of the present embodiment, a coded data input unit 201 receives coded data of image (i.e., frames) of an object or scene photographed by a first camera as a decoding target. Coded data memory 202 stores coded data input from the coded data input unit 201. The stored coded data is supplied to an image decoding unit 209.

A view synthesis image input unit 203 receives inputs of view synthesis images for decoding target images. View synthesis images have been generated using the already decoded images on which the same object or scene was photographed by second cameras placed in different positions from the first camera. View synthesis image memory 204 stores view synthesis images input from the view synthesis image input unit 203. Stored view synthesis images are supplied to a correction parameter creation unit 207 and a view synthesis image correction unit 208.

A depth information input unit 205 receives inputs of depth information for frames targeted for decoding. Depth information memory 206 stores depth information input from the depth information input unit 205. The stored depth information is supplied to the correction parameter creation unit 207.

The correction parameter creation unit 207 estimates correction parameters using view synthesis images, depth information, and decoded images used in peripheral areas of a decoding target area, and using depth information used in the decoding target area. The view synthesis image correction unit 208 corrects view synthesis images of the area targeted for decoding using the estimated correction parameters.

The image decoding unit 209 decodes image signals of the decoding target area using the corrected view synthesis images as prediction signals. (10) Decoded image memory 210 stores images decoded by the image decoding unit 209.

As is shown in FIG. 8, the correction parameter creation unit 207 has an object determination unit 207a to which depth information is supplied from the depth information memory 206, and a representative depth setting unit 207b and a sample pixel group setting unit 207c which are connected in this sequence to the downstream side of the object determination unit 207a. A correction model selection unit 207d and a correction parameter estimation unit 207e are connected in this sequence to the downstream side of the sample pixel group setting unit 207c. Decoded images from the decoded image memory 210 and view synthesis images from the view synthesis image memory 204 are supplied to the correction parameter estimation unit 207e, and correction parameters estimated using the supplied decoded images and view synthesis images are supplied to the view synthesis image correction unit 208.

Figure 6:
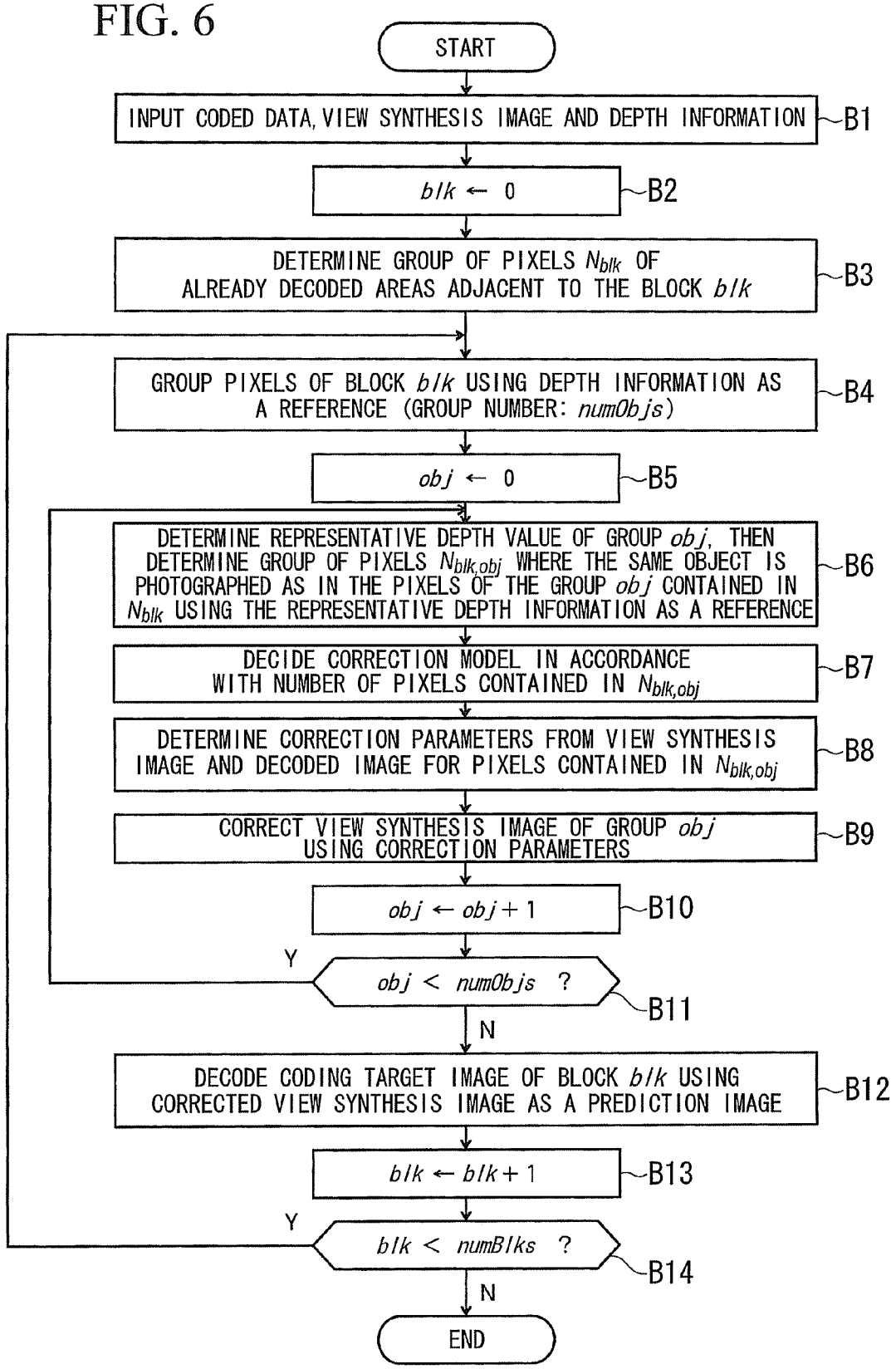
FIG. 6 is a flow chart showing processing executed by the multi-view video decoding device according to the second embodiment of the present invention.

FIG. 6 shows the flow of processing executed by the multi-view video decoding device 200 of the second embodiment which is structured in the above-described manner.

The processing executed by the multi-view video decoding device 200 of the present embodiment will now be described in detail in accordance with this processing flow.

Firstly, coded data for a frame which is targeted for decoding is input by the decoding data input unit 201, and is stored in the coded data memory 202. A view synthesis image Synth for the decoding target frame is input by the view synthesis image input unit 203, and is stored in the view synthesis image memory 204. Depth information Depth for the decoding target frame is input by the depth information input unit 205, and is stored in the depth information memory 206 [B1].

The view synthesis image and the depth information which are input here are the same as those obtained by the coding device. The reason for this is that, by using the same information as the information obtained at the coding device, the generation of coding noises such as drift can be suppressed. However, if the generation of such coding noise is permissible, then it is also possible for different information from that obtained by the coding device to be input.

Note that the depth information is provided from outside the multi-view video decoding device 200, however, as is described in Non-patent document 3, it is also possible to obtain the depth information by estimating it from already decoded frames on other cameras. Accordingly, it is not essential for the depth information to be transmitted from the transmitting side to the receiving side. The view synthesis image is generated using already decoded frames on cameras other than the first camera and depth information.

Next, the decoding target frame is divided into a plurality of decoding target areas, and the image signal of the decoding target frame is decoded by the image decoding unit 209 with correcting the view synthesis image for each of these areas [B2-B14].

Namely, if an index of the decoding processing block is expressed as blk, and if the total number of all the decoding processing blocks is expressed as numBlks, then after blk has been initialized to 0 [B2], the following steps [B3-B12] are repeated with 1 being added to blk [B13] until blk reaches numBlks [B14].

In the processing that is repeated for each decoding processing block, the decoding device 200 first determines a group of pixels $N_{blk}$ of already-decoded areas peripheral to the block blk (i.e., the decoding target area) [B3].

Various types of unit can be used for these peripheral areas such as decoding processing blocks which are adjacent to the block blk, or adjacent pixels or the like. Although a variety of definitions can be used for the peripheral areas, it is necessary for the same definition as that used on the coding side to be used.

Next, the object determination unit 207a of the correction parameter creation unit 207 groups pixels within the block blk using the depth information provided for each pixel as a reference [object determination step B4].

The index of each group resulting from this is expressed by obj, the number of groups is expressed by numObjs, and the pixels belonging to the group obj are expressed as $C_{obj}$. The processing performed here is the same as that performed in the object determination step A4 of the first embodiment.

Once the grouping has ended, a prediction image Pred is created by correcting the view synthesis image for each pixel of each group [B5-B11].

Namely, after the group index obj has been initialized to 0 [B5], steps [B6-B8] are performed in which, with increment obj by 1 [B10], correction parameters are estimated in order to correct the view synthesis image in the correction parameter creation unit 207 until obj reaches numObjs [B11]. Together with the steps, in the view synthesis image correction unit 208, a step [B9] to create a prediction image by correcting the view synthesis images for pixels contained in the group obj using the estimated prediction parameters is performed.

Figure 7:
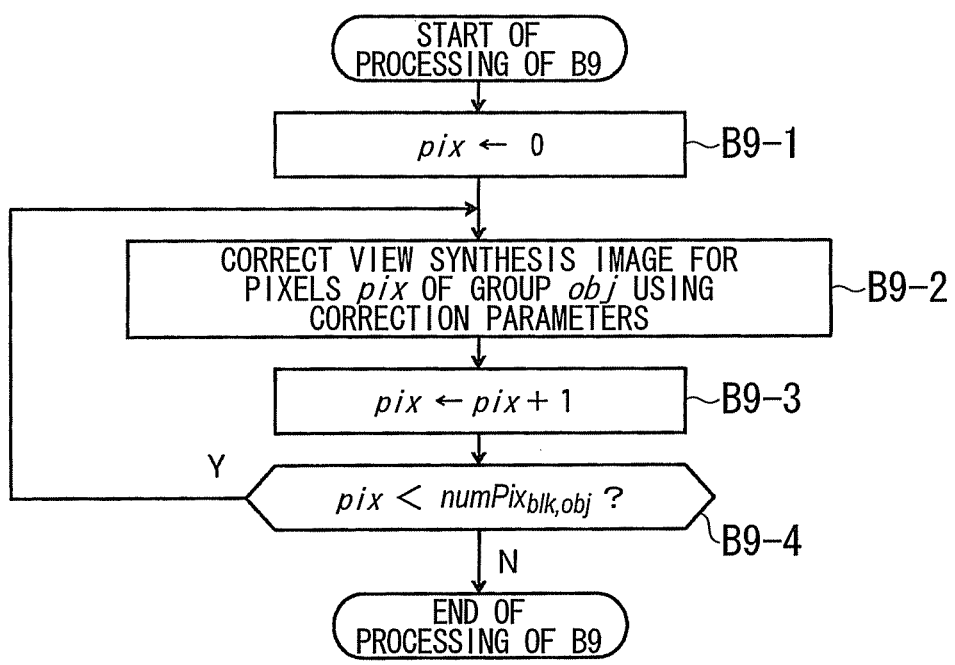
FIG. 7 is a flow chart showing details of the processing executed by the multi-view video decoding device according to the second embodiment of the present invention.

The processing in this step B9 is the same as that in step A9 of the first embodiment and, as is shown in the processing flow in FIG. 7, is performed for each pixel. Here, in the processing flow in FIG. 7, pix indicates pixel identification information, and numPix$_{blk,obj}$ indicates the number of pixels within the group obj of the block blk. The correction parameter estimation steps [B6-B8] which are performed by the representative depth setting unit 207b, the sample pixel group setting unit 207c, the correction model selection unit 207d, and the correction parameter estimation unit 207e are the same as the steps A6-A8 of the first embodiment.

After the creation of the prediction image for the block blk has ended, in the image decoding unit 209, the decoding target image Dec is decoded for the block blk [B12] with the prediction image Pred created in step B9 being used for the prediction signal.

It is necessary for the decoding processing performed here to correspond to the method used when the coded data was created. For example, if the coding was performed using H.264, then the decoding processing is performed by adding the prediction signal to the residual signal decoded by applying entropy decoding, value multiplexing, inverse quantization, and inverse DCT.

The decoded image resulting from the decoding forms the output from the multi-view decoding device 200, and is stored in the decoded image memory 210 to be used for estimating correction parameters in other blocks.

In this manner, the multi-view video decoding device 200 which is structure in the above described manner as shown in FIG. 5 decodes the coded data of the multi-view video decoding created by the multi-view video coding device 100 as shown in FIG. 1.

In the present embodiment, a case has been described in which the block blk is coded with the usage of view synthesis images being essential. Even in cases in which coded data is decoded by employing as one of a plurality of existing prediction modes a prediction mode that makes use of view synthesis images, images are only decoded in accordance with the above described processing flow when this prediction mode is being used, while when other prediction modes are being used, images can be decoded by using a conventional decoding method that corresponds to that prediction mode (i.e., to one of these other prediction modes).

In the above-described first and second embodiments, corrections are made in all of the blocks, however, it is also possible to employ a structure in which whether or not to perform a correction is chosen by coding one bit of flag information in each block.

Moreover, a method also exists in which the reliability of the correction parameters is measured, and then whether or not to perform a correction is chosen based on the degree of the reliability instead of coding a bit of flag information.

Specifically, it is possible, after the correction parameters have been determined in step A8 and step B8, to calculate a value that expresses the feasibility and effectiveness of the correction, for example, by using the following Formula (8) through Formula (10). The view synthesis image correction units 108 and 208 correct view synthesis image in step A9 and step B9 and output it as prediction images only when the calculated value is larger than a pre-defined threshold value, while in all other cases, the view synthesis image without corrections is output as the prediction image.

$$R = \sum_{p \in N_{blk,obj}} |Dec[p] - Synth[p]| - |Dec[p] - Pred[p]| \quad (8)$$

$$R = \sum_{p \in N_{blk,obj}} |Dec[p] - Synth[p]|^2 - |Dec[p] - Pred[p]|^2 \quad (9)$$

$$R = 1 - \frac{\sum_{p \in N_{blk,obj}} (Dec[p] - Pred[p])^2}{\sum_{p \in N_{blk,obj}} \left(Dec[p] - \frac{1}{\|N_{blk,obj}\|} \sum_{q \in N_{blk,obj}} (Dec[q])\right)^2} \quad (10)$$

The first term in Formula (8) shows the sum of absolute differences between the decoded image Dec and the view synthesis image Synth, while the second term shows the sum of absolute differences between the decoded image Dec and the prediction image Pred. Namely, Formula (8) shows how many the sum of absolute differences between the true value and the prediction value has been reduced by the correction. Moreover, the first term in Formula (9) shows the sum of squared differences between the decoded image Dec and the view synthesis image Synth, while the second term shows the sum of squared differences between the decoded image Dec and the prediction image Pred. Namely, Formula (9) shows how far the sum of squared differences between the true value and the prediction value has been reduced by the correction. Formula (10) shows the feasibility of the correction model on the samples. Here, because all of these values are determined using values not from the processing target block, but from areas peripheral thereto, it is only necessary to encode those threshold values which are used universally and then provide these to the decoding side.

Note that in the present embodiment, processing to encode or decode one frame of one camera has been described, however, by repeating this processing for each frame, it is possible to achieve the coding or decoding of a multi-view video. Furthermore, by repeating this processing for each camera, it is possible to achieve the coding or decoding of the multi-view video of a plurality of cameras.

The processing described above can also be achieved by a computer and software program, and such a program can be supplied by being recorded on a computer readable recording medium, or can be supplied via a network.

Moreover, in the above described embodiments, the description is centered on a multi-view video coding device and a multi-view video decoding device, however, the multi-view video coding method of the present invention can be achieved by means of steps that correspond to the operations of each portion of this multi-view video coding device. In the same way, the multi-view video decoding method of the present invention can be achieved by means of steps that correspond to the operations of each portion of this multi-view video decoding device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

The present invention can be applied to multi-view image encoding processes. By applying the present invention, it is possible to achieve highly efficient encoding and decoding of multi-view image and multi-view video in which there are local and object-dependent illumination and color mismatches between cameras, and that is able to greatly reduce the amount of code required in cases that this new invention is employed.

Reference Symbols

100 . . . Multi-view video coding device
101 . . . Coding target image input unit
102 . . . Coding target image memory
103 . . . View synthesis image input unit
104 . . . View synthesis image memory
105 . . . Depth information input unit
106 . . . Depth information memory
107 . . . Correction parameter creation unit
108 . . . View synthesis image correction unit
109 . . . Image coding unit
110 . . . Image decoding unit
111 . . . Decoded image memory
200 . . . Multi-view video decoding device
201 . . . Coded data input unit
202 . . . Coded data memory
203 . . . View synthesis image input unit
204 . . . View synthesis image memory
205 . . . Depth information input unit
206 . . . Depth information memory
207 . . . Correction parameter creation unit
208 . . . View synthesis image correction unit
209 . . . Image decoding unit
210 . . . Decoded image memory

The invention claimed is:

1. A multi-view image coding method in which an input image of an object which is photographed by a first camera is divided into a plurality of coding target areas and, using a view synthesis image which is synthesized from depth information for the input image and from already coded image of the same object photographed by a second camera that is located in a different position from the first camera, predictive coding is performed for each of the coding target areas, comprising:
   a representative depth setting step in which representative depth information for an object photographed in the coding target area is set;
   a sample pixel group setting step in which, based on depth information for an already coded area that is adjacent to the coding target area and on the representative depth information, a group of pixels where the same object as in the coding target area has been photographed is determined and is set as a sample pixel group;
   a correction parameter estimation step in which, based on the view synthesis image for the sample pixel group and on a decoded image that has been decoded for the sample pixel group, correction parameters for correcting illumination and color mismatches are estimated;
   a view synthesis image correction step in which, using the correction parameters, the view synthesis image for the coding target area is corrected so as to create a corrected view synthesis image;
   an image coding step in which, using the corrected view synthesis image, an image signal of the coding target image is coded so as to create coded data; and
   an image decoding step in which the coded data is decoded so as to create a decoded image for the coding target area.

2. The multi-view image coding method according to claim 1, wherein
   there is provided an object determination step in which pixels in the coding target area are divided into one or several groups using depth information for the relevant pixels as a reference, and
   in the representative depth setting step, the representative depth information is set for each group determined in the object determination step,
   in the sample pixel group setting step, a sample pixel group is set for each group determined in the object determination step,
   in the correction parameter estimation step, correction parameters are estimated for each group determined in the object determination step, and
   in the view synthesis image correction step, a view synthesis image is corrected for each group determined in the object determination step.

3. The multi-view image coding method according to claim 2, wherein
   there is provided a correction model selection step in which a correction model is selected for correcting the view synthesis image for the coding target area in accordance with the number of pixels in the sample pixel group, and
   in the correction parameter estimation step, correction parameters for the correction model selected in the correction model selection step are estimated, and
   in the view synthesis image correction step, the view synthesis image is corrected using the correction model selected in the correction model selection step.

4. The multi-view image coding method according to claim 1, wherein
   there is provided a correction model selection step in which a correction model is selected for correcting the view synthesis image for the coding target area in accordance with the number of pixels in the sample pixel group, and
   in the correction parameter estimation step, correction parameters for the correction model selected in the correction model selection step are estimated, and
   in the view synthesis image correction step, the view synthesis image is corrected using the correction model selected in the correction model selection step.

5. A non-transitory computer-readable recording medium which stores multi-view image coding program that enables the multi-view image coding method according to claim 1 to be executed on a computer.

6. A multi-view image decoding method in which a decoding target image of an object which is photographed by a first camera is divided into a plurality of decoding target areas, and using a view synthesis image which is synthesized from depth information for the decoding target image and from an already decoded image of the same object photographed by a second camera that is located in a different position from the first camera, predictive decoding is performed for each of the decoding target areas, comprising:

a representative depth setting step in which representative depth information for an object photographed in the decoding target area is set;

a sample pixel group setting step in which, based on depth information for an already decode area that is adjacent to the decoding target area and on the representative depth information, a pixel group where the same object as in the decoding target area has been photographed is determined and is set as a sample pixel group;

a correction parameter estimation step in which, based on the view synthesis image for the sample pixel group and on a decoded image that has been decoded for the sample pixel group, correction parameters for correcting illumination and color mismatches are estimated;

a view synthesis image correction step in which, using the correction parameters, the view synthesis image for the decoding target area is corrected so as to create a corrected view synthesis image; and an image decoding step in which, using the corrected view synthesis image, an image signal of the decoding target image is decoded.

7. The multi-view image decoding method according to claim 6, wherein there is provided an object determination step in which pixels in the decoding target area are divided into one or several groups using depth information for the relevant pixels as a reference, and in the representative depth setting step, the representative depth information is set for each group determined in the object determination step, in the sample pixel group setting step, a sample pixel group is set for each group determined in the object determination step, in the correction parameter estimation step, correction parameters are estimated for each group determined in the object determination step, and in the view synthesis image correction step, a view synthesis image is corrected for each group determined in the object determination step.

8. The multi-view image decoding method according to claim 7, wherein there is provided a correction model selection step in which a correction model is selected for correcting the view synthesis image for the decoding target area in accordance with the number of pixels in the sample pixel group, and in the correction parameter estimation step, correction parameters for the correction model selected in the correction model selection step are estimated, and in the view synthesis image correction step, the view synthesis image is corrected using the correction model selected in the correction model selection step.

9. The multi-view image decoding method according to claim 6, wherein there is provided a correction model selection step in which a correction model is selected for correcting the view synthesis image for the decoding target area in accordance with the number of pixels in the sample pixel group, and in the correction parameter estimation step, correction parameters for the correction model selected in the correction model selection step are estimated, and in the view synthesis image correction step, the view synthesis image is corrected using the correction model selected in the correction model selection step.

10. A non-transitory computer-readable recording medium which stores multi-view image decoding program that enables the multi-view image decoding method according to claim 6 to be executed on a computer.

11. A multi-view image coding device that encodes multi-view images by dividing an input image of an object which is photographed by a first camera into a plurality of coding target areas and, using a view synthesis image which is synthesized from depth information for the input image and from an already coded image of the same object photographed by a second camera that is located in a different position from the first camera, by performing predictive coding for each of the coding target areas, comprising:

a representative depth setting unit that sets representative depth information for a object photographed in the coding target area;

a sample pixel group setting unit that, based on depth information for an already coded area that is adjacent to the coding target area and on the representative depth information, determines a group of pixels where the same object as in the coding target area has been photographed and sets the group of pixels as a sample pixel group;

a correction parameter estimation unit that, based on the view synthesis image for the sample pixel group and on a decoded image that has already been decoded for the sample pixel group, estimates correction parameters for correcting illumination and color mismatches;

a view synthesis image correction unit that, using the correction parameters, corrects the view synthesis image for the coding target area so as to create a corrected view synthesis image;

an image coding unit that, using the corrected view synthesis image, codes an image signal of the coding target image is coded so as to create coded data; and an image decoding unit that decodes the coded data so as to create a decoded image for the coding target area.

12. A multi-view image decoding device that decodes coded data for multi-view image by dividing a decoding target image of an object which is photographed by a first camera into a plurality of decoding target areas and, using a view synthesis image which is synthesized from depth information for the decoding target image and from an already decoded image of the same object photographed by a second camera that is located in a different position from the first camera, by performing predictive decoding for each of the decoding target areas, comprising:

a representative depth setting unit that sets representative depth information for an object photographed in the decoding target area;

a sample pixel group setting unit that, based on depth information for an already decoded area that is adjacent to the decoding target area and on the representative depth information, determines a group of pixels where the same object as in the decoding target area has been photographed and sets the group of pixels as a sample pixel group;

a correction parameter estimation unit that, based on the view synthesis image for the sample pixel group and on a decoded image that has been decoded for the sample pixel group, estimates correction parameters for correcting illumination and color mismatches;

a view synthesis image correction unit that, using the correction parameters, corrects the view synthesis image for the decoding target area so as to create a corrected view synthesis image; and an image decoding unit that, using the corrected view synthesis image, decodes an image signal of the decoding target image.

13. A multi-view image coding method in which an input image of an object which is photographed by a first camera is divided into a plurality of coding target areas and, using a view synthesis image which is synthesized from depth information for the input image and from already coded image of the same object photographed by a second camera that is located in a different position from the first camera, predictive coding is performed for each of the coding target areas, comprising:

a representative depth setting step in which representative depth information for an object photographed in the coding target area is set;

a sample pixel group setting step in which, based on depth information for an already coded area that is adjacent to the coding target area and on the representative depth information, a group of pixels where the same object as in the coding target area has been photographed is determined and is set as a sample pixel group;

a correction parameter estimation step in which, based on the view synthesis image for the sample pixel group and on a decoded image that has been decoded for the sample pixel group, correction parameters for correcting at least one of illumination and color mismatches are estimated;

a view synthesis image correction step in which, using the correction parameters, the view synthesis image for the coding target area is corrected so as to create a corrected view synthesis image;

an image coding step in which, using the corrected view synthesis image, an image signal of the coding target image is coded so as to create coded data; and an image decoding step in which the coded data is decoded so as to create a decoded image for the coding target area.

14. The multi-view image coding method according to claim 13, wherein there is provided an object determination step in which pixels in the coding target area are divided into one or several groups using depth information for the relevant pixels as a reference, and in the representative depth setting step, the representative depth information is set for each group determined in the object determination step, in the sample pixel group setting step, a sample pixel group is set for each group determined in the object determination step, in the correction parameter estimation step, correction parameters are estimated for each group determined in the object determination step, and in the view synthesis image correction step, a view synthesis image is corrected for each group determined in the object determination step.

15. The multi-view image coding method according to claim 14, wherein there is provided a correction model selection step in which a correction model is selected for correcting the view synthesis image for the coding target area in accordance with the number of pixels in the sample pixel group, and in the correction parameter estimation step, correction parameters for the correction model selected in the correction model selection step are estimated, and in the view synthesis image correction step, the view synthesis image is corrected using the correction model selected in the correction model selection step.

16. The multi-view image coding method according to claim 13, wherein there is provided a correction model selection step in which a correction model is selected for correcting the view synthesis image for the coding target area in accordance with the number of pixels in the sample pixel group, and in the correction parameter estimation step, correction parameters for the correction model selected in the correction model selection step are estimated, and in the view synthesis image correction step, the view synthesis image is corrected using the correction model selected in the correction model selection step.

17. A non-transitory computer-readable recording medium which stores multi-view image coding program that enables the multi-view image coding method according to claim 13 to be executed on a computer.

18. A multi-view image decoding method in which a decoding target image of an object which is photographed by a first camera is divided into a plurality of decoding target areas, and using a view synthesis image which is synthesized from depth information for the decoding target image and from an already decoded image of the same object photographed by a second camera that is located in a different position from the first camera, predictive decoding is performed for each of the decoding target areas, comprising:

a representative depth setting step in which representative depth information for an object photographed in the decoding target area is set;

a sample pixel group setting step in which, based on depth information for an already decode area that is adjacent to the decoding target area and on the representative depth information, a pixel group where the same object as in the decoding target area has been photographed is determined and is set as a sample pixel group;

a correction parameter estimation step in which, based on the view synthesis image for the sample pixel group and on a decoded image that has been decoded for the sample pixel group, correction parameters for correcting at least one of illumination and color mismatches are estimated;

a view synthesis image correction step in which, using the correction parameters, the view synthesis image for the decoding target area is corrected so as to create a corrected view synthesis image; and an image decoding step in which, using the corrected view synthesis image, an image signal of the decoding target image is decoded.

19. The multi-view image decoding method according to claim 18, wherein there is provided an object determination step in which pixels in the decoding target area are divided into one or several groups using depth information for the relevant pixels as a reference, and in the representative depth setting step, the representative depth information is set for each group determined in the object determination step, in the sample pixel group setting step, a sample pixel group is set for each group determined in the object determination step, in the correction parameter estimation step, correction parameters are estimated for each group determined in the object determination step, and in the view synthesis image correction step, a view synthesis image is corrected for each group determined in the object determination step.

20. The multi-view image decoding method according to claim 19, wherein there is provided a correction model selection step in which a correction model is selected for correcting the view synthesis image for the decoding target area in accordance with the number of pixels in the sample pixel group, and in the correction parameter estimation step, correction parameters for the correction model selected in the correction model selection step are estimated, and in the view synthesis image correction step, the view synthesis image is corrected using the correction model selected in the correction model selection step.

21. The multi-view image decoding method according to claim 18, wherein there is provided a correction model selection step in which a correction model is selected for correcting the view synthesis image for the decoding target area in accordance with the number of pixels in the sample pixel group, and in the correction parameter estimation step, correction parameters for the correction model selected in the correction model selection step are estimated, and in the view synthesis image correction step, the view synthesis image is corrected using the correction model selected in the correction model selection step.

22. A non-transitory computer-readable recording medium which stores multi-view image decoding program that enables the multi-view image decoding method according to claim 16 to be executed on a computer.

23. A multi-view image coding device that encodes multi-view images by dividing an input image of an object which is photographed by a first camera into a plurality of coding target areas and, using a view synthesis image which is synthesized from depth information for the input image and from an already coded image of the same object photographed by a second camera that is located in a different position from the first camera, by performing predictive coding for each of the coding target areas, comprising:

a representative depth setting unit that sets representative depth information for a object photographed in the coding target area;

a sample pixel group setting unit that, based on depth information for an already coded area that is adjacent to the coding target area and on the representative depth information, determines a group of pixels where the same object as in the coding target area has been photographed and sets the group of pixels as a sample pixel group;

a correction parameter estimation unit that, based on the view synthesis image for the sample pixel group and on a decoded image that has already been decoded for the sample pixel group, estimates correction parameters for correcting at least one of illumination and color mismatches;

a view synthesis image correction unit that, using the correction parameters, corrects the view synthesis image for the coding target area so as to create a corrected view synthesis image;

an image coding unit that, using the corrected view synthesis image, codes an image signal of the coding target image is coded so as to create coded data; and an image decoding unit that decodes the coded data so as to create a decoded image for the coding target area.

24. A multi-view image decoding device that decodes coded data for multi-view image by dividing a decoding target image of an object which is photographed by a first camera into a plurality of decoding target areas and, using a view synthesis image which is synthesized from depth information for the decoding target image and from an already decoded image of the same object photographed by a second camera that is located in a different position from the first camera, by performing predictive decoding for each of the decoding target areas, comprising:

a representative depth setting unit that sets representative depth information for an object photographed in the decoding target area;

a sample pixel group setting unit that, based on depth information for an already decoded area that is adjacent to the decoding target area and on the representative depth information, determines a group of pixels where the same object as in the decoding target area has been photographed and sets the group of pixels as a sample pixel group;

a correction parameter estimation unit that, based on the view synthesis image for the sample pixel group and on a decoded image that has been decoded for the sample pixel group, estimates correction parameters for correcting at least one of illumination and color mismatches;

a view synthesis image correction unit that, using the correction parameters, corrects the view synthesis image for the decoding target area so as to create a corrected view synthesis image; and an image decoding unit that, using the corrected view synthesis image, decodes an image signal of the decoding target image.

* * * * *